US009428070B2

(12) United States Patent
Bell et al.

(10) Patent No.: US 9,428,070 B2
(45) Date of Patent: Aug. 30, 2016

(54) HANDS FREE VEHICLE CHARGING SYSTEM

(71) Applicant: FORD GLOBAL TECHNOLOGIES, LLC, Dearborn, MI (US)

(72) Inventors: Christopher W. Bell, Livonia, MI (US); Frank Kallio, Novi, MI (US); John Paul Gibeau, Canton, MI (US); James A. Lathrop, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 188 days.

(21) Appl. No.: 14/339,816

(22) Filed: Jul. 24, 2014

(65) Prior Publication Data

US 2016/0023565 A1    Jan. 28, 2016

(51) Int. Cl.
*H02J 7/00* (2006.01)
*H02J 7/14* (2006.01)
*B60L 11/18* (2006.01)

(52) U.S. Cl.
CPC .......... *B60L 11/1833* (2013.01); *B60L 11/182* (2013.01); *B60L 11/1816* (2013.01); *B60L 11/1829* (2013.01); *Y02T 10/7005* (2013.01); *Y02T 10/7088* (2013.01); *Y10S 903/907* (2013.01)

(58) Field of Classification Search
CPC .............. B60L 11/1833; B60L 11/182; B60L 11/1829; B60L 11/1816
USPC ............................ 320/104, 109, 108; 701/22
See application file for complete search history.

(56) References Cited

U.S. PATENT DOCUMENTS

| | | | | |
|---|---|---|---|---|
| 5,184,766 A * | 2/1993 | Takahashi | ............ | B23K 37/047 228/4.1 |
| 5,231,747 A * | 8/1993 | Clark | ........................ | B21J 15/10 227/152 |
| 5,498,948 A | 3/1996 | Bruni et al. | | |
| 5,613,814 A * | 3/1997 | Jackson | .................... | B60P 7/13 410/69 |
| 6,327,994 B1 * | 12/2001 | Labrador | ............... | B01D 61/10 114/382 |
| 7,993,155 B2 * | 8/2011 | Heichal | .................... | B60K 1/04 180/65.1 |
| 7,999,506 B1 | 8/2011 | Hollar et al. | | |
| 8,033,349 B2 | 10/2011 | Ortmann et al. | | |
| 8,251,734 B2 * | 8/2012 | Katagiri | .................. | B60L 11/14 439/352 |
| 8,384,344 B1 | 2/2013 | Rogers | | |
| 2012/0286730 A1 * | 11/2012 | Bonny | ................ | B60L 11/1827 320/109 |
| 2013/0249470 A1 * | 9/2013 | Martin | .................. | B60L 11/182 320/107 |
| 2015/0239352 A1 * | 8/2015 | Bell | ...................... | B60L 11/182 320/108 |

* cited by examiner

*Primary Examiner* — M'Baye Diao
(74) *Attorney, Agent, or Firm* — David B. Kelley; Brooks Kushman P.C.

(57) ABSTRACT

A vehicle charging system may include a charge receptacle and an alignment pin mounted to a vehicle and a ground station. The ground station may include a guide having a locating region configured to receive the alignment pin and in response to the alignment pin contacting the locating region translate along a track. An electrical connector may be configured to engage the charge receptacle. The electrical connector may be disposed within a housing associated with the guide.

19 Claims, 4 Drawing Sheets

HANDS FREE VEHICLE CHARGING SYSTEM

TECHNICAL FIELD

This patent application relates to a vehicle charging system.

BACKGROUND

Plug-in vehicles may enable an operator of the vehicle to connect the vehicle to an external power source. This may enable an operator to charge a vehicle battery at a plurality of locations. The operator may manually connect and disconnect a charging cable to the vehicle to charge the vehicle battery. Alternatively, a self-aligning vehicle charger may provide convenience for the driver to connect or disconnect the vehicle to the charger.

SUMMARY

In at least one embodiment, a vehicle charging system is provided. The vehicle charging system may include a ground station and a charge receptacle and an alignment pin mounted to a vehicle. The ground station may include a guide and an electrical connector. The guide may have a locating region configured to receive the alignment pin and translate along a track in response to the alignment pin contacting the locating region. The electrical connector may be associated with the guide and disposed within a housing. The electrical connector may be configured to engage the charge receptacle.

In at least one embodiment, the vehicle charging system may include a guide pin and a secondary coil disposed on a vehicle underbody. The vehicle charging system may further include a docking station having a movable guide configured to receive the guide pin and a primary coil. The primary coil may be movable with the guide to align the primary coil and the secondary coil, in response to the guide pin contacting the movable guide.

In at least one embodiment, a plug-in electric vehicle is provided. The plug-in electric vehicle may include a deployable vehicle mounted pin configured to engage a movable guide to align a vehicle mounted charge receiving device with an off-vehicle charge delivery device.

DETAILED DESCRIPTION

As required, detailed embodiments of the present disclosure are described herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the embodiments.

Plug-in vehicles, including plug-in hybrid electric vehicles (PHEV) and battery electric vehicles (BEV), may include a vehicle traction battery configured to supply electric power to a traction motor. The traction battery, traction motor, and other components cooperate as an electric drive system. In a BEV the electric drive system may be the only source of propulsive power to vehicle traction wheels, while a PHEV may additionally be provided with an internal combustion engine. Such vehicles may be connected to an external power supply to recharge the traction battery when the vehicle is parked.

For some PHEV's or BEV's, a customer may be required to exit the vehicle to connect the vehicle to an external power supply and charge the traction battery using charge cables. The charge cables may be dirty or wet or inconveniently stowed within the vehicle or proximate the vehicle.

A hands-free plug-in electric vehicle charging system may be provided to enable the customer to stay within the vehicle and connect the vehicle to the external power supply. The hands free electric vehicle charging system may enable the vehicle to drive towards a ground station and connect the vehicle to the ground station. A hands free electric vehicle charging system may require precise locating of the external electrical connector relative to a vehicle mounted charge port.

Figure 1:
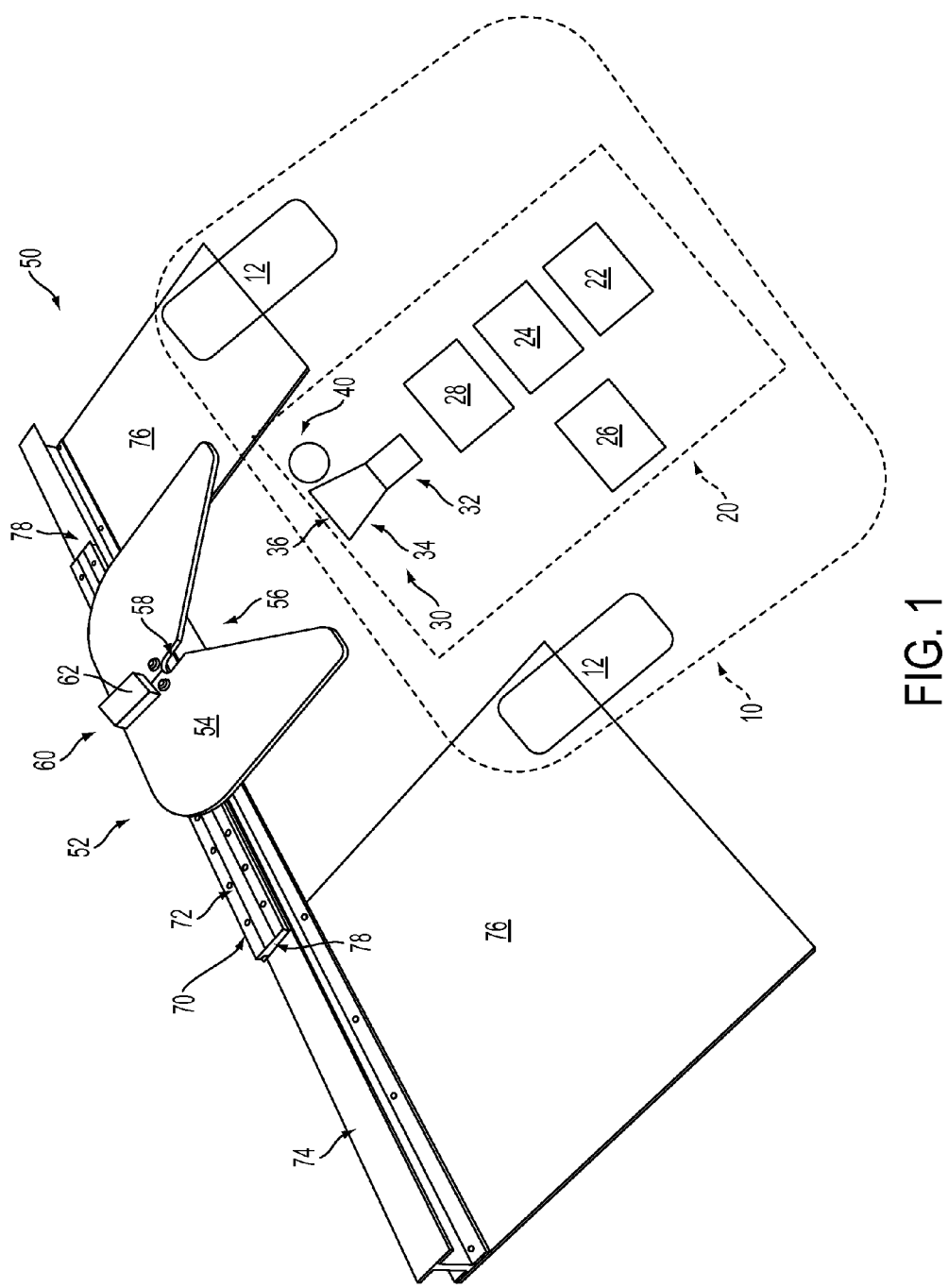
FIG. 1 is a schematic of a vehicle and a vehicle charging system.

Referring to FIG. 1, a vehicle 10 configured to engage a vehicle charging system 50 is illustrated according to an embodiment of the present disclosure. The vehicle 10 may be provided with an electric drive system 20. The vehicle electric drive system 20 may include a traction battery 22, an electric machine 24, a controller 26 and a vehicle mounted charge receptacle assembly 30. The vehicle mounted charge receptacle assembly 30 may be configured to charge the traction battery 22 when the vehicle 10 is connected to the vehicle charging system. The electric drive system 20 may be operatively coupled to an internal combustion engine 28, if the vehicle 10 is so equipped.

The traction battery 22 and the vehicle mounted charge receptacle assembly 30 may be in communication with or under the control of the controller 26. The controller 26 may control the vehicle mounted charge receptacle assembly 30 to selectively enable or disable recharging of the traction battery 22.

Although illustrated as a single controller, the controller 26 may include multiple controllers that operate in conjunction to control various vehicle systems. For example, the controller 26 may be a vehicle system controller/powertrain control module (VSC/PCM). In this regard, the vehicle charging control portion of the VSC/PCM can be software embedded within the VSC/PCM, or it can be a separate hardware device. The controller 26 generally includes any number of microprocessors, ASICs, ICs, memory (e.g., FLASH, ROM, RAM, EPROM and/or EEPROM) and software code to co-act with one another to perform a series of operations. The controller 26 may be in electrical communication with the traction battery 22 and receives signals that indicate the battery state of charge level. The controller 26 may further communicate with other controllers over a hardline vehicle connection using a common bus protocol (e.g., CAN), and may also employ wireless communication.

The vehicle mounted charge receptacle assembly 30 may be disposed within the front fascia of the vehicle, the underside of the vehicle, or other locations to enable engagement of an off-vehicle charge delivery device with the vehicle mounted charge receptacle assembly 30. If the vehicle mounted charge receptacle assembly 30 is disposed on the vehicle underside or vehicle underbody, the vehicle mounted charge receptacle assembly 30 may be disposed above a scuff plane of the vehicle 10. The location above the scuff plane may prevent damage to the vehicle mounted charge receptacle if contact is made with the ground.

The vehicle mounted charge receptacle assembly 30 may include a charge receptacle 32, a charge receptacle housing 34, and a movable door 36. The charge receptacle 32 may be spring loaded to accommodate offset or over-run between the vehicle 10 and the vehicle charging system 50.

The vehicle mounted charge receptacle 32 may be an electrical connector of any suitable type. The vehicle mounted charge receptacle 32 may be a female electrical connector configured to mate with a male connector disposed proximate the vehicle charging system 50. For greater economy, readily available J1772 male or female connectors may be employed.

The vehicle mounted charge receptacle 32 may be disposed within a receptacle housing 34. The receptacle housing 34 may be implemented as a weather protection box configured as a shielding hood to protect the charge receptacle 32 from the elements. The receptacle housing 34 may be provided with a movable door 36. The movable door 36 may be a normally-closed hinged front door so it is protected from the elements while driving. As the vehicle approaches the vehicle charging system 50, the movable door 36 may be automatically opened.

The receptacle housing 34 may be provided with a tapered region disposed between the movable door 36 and the charge receptacle 32. The tapered region may align the off-vehicle charge delivery device 60, with the charge receptacle assembly 30 to accommodate for offset during engagement of the vehicle charging system 50 and vehicle mounted charge receptacle assembly 30.

The vehicle 10 may be provided with an alignment pin 40 disposed on a vehicle underside 42. The alignment pin 40 may be provided as part of vehicle mounted charge receptacle assembly 30. The alignment pin 40 may extend from the receptacle housing 34 or be retractable into the receptacle housing 34. Alternatively, the alignment pin 40 may be disposed proximate the vehicle mounted charge receptacle assembly 30.

Figure 2A:
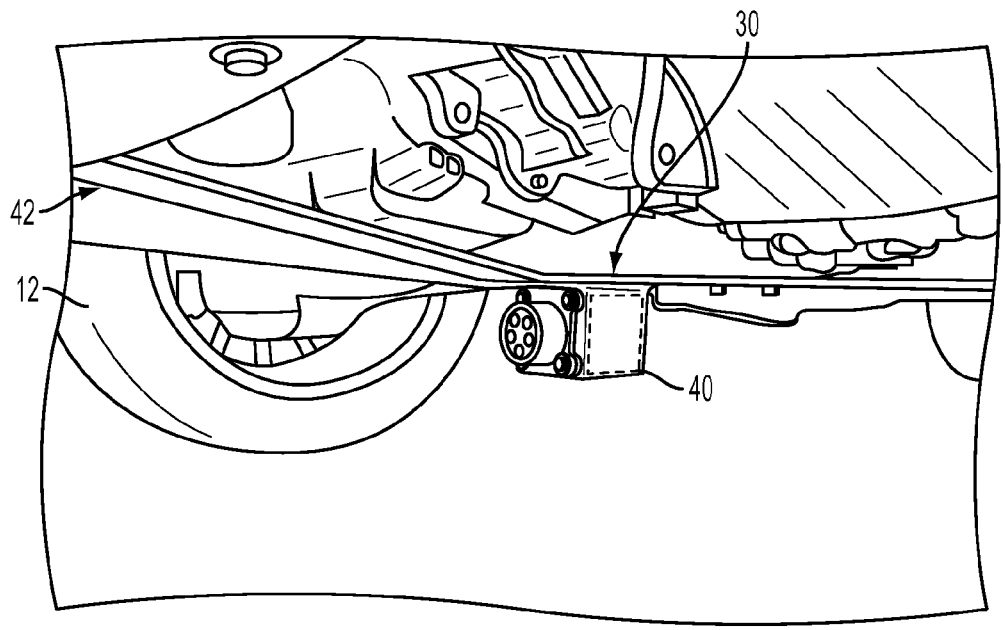
FIGS. 2A and 2B are perspective views of a portion of the vehicle and the vehicle charging system.
Figure 2B:
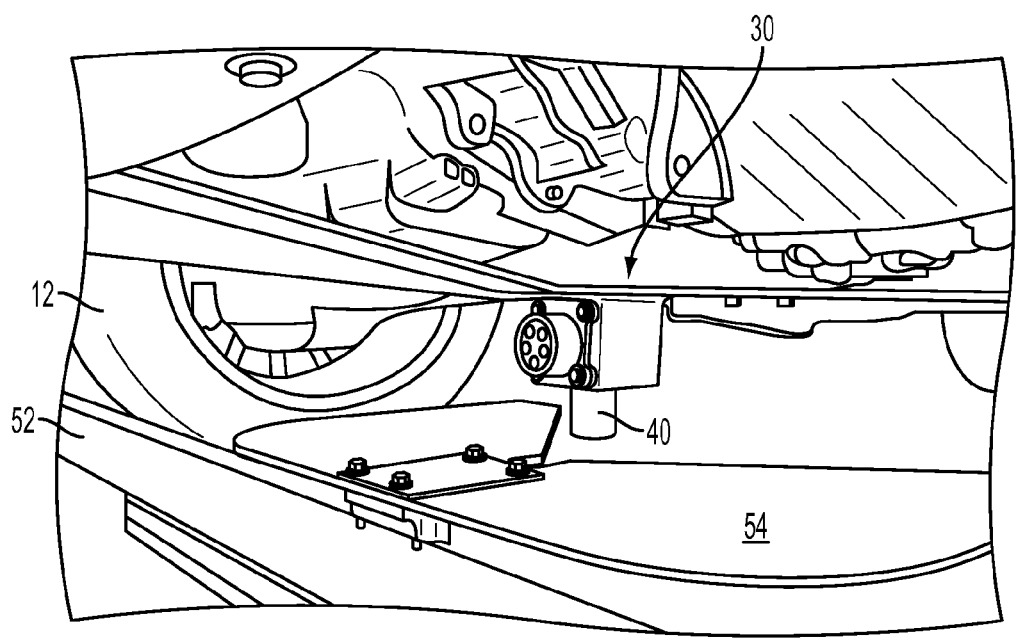

The alignment pin 40 may act as a guide pin to assist in aligning the vehicle charging system 50 with the vehicle mounted charge receptacle assembly 30. The alignment pin 40 may be deployable from a first retracted position (FIG. 2A) to a second deployed position (FIG. 2B). The alignment pin 40 may be deployed from the first retracted position, in response to a vehicle location proximate the vehicle charging system 50. The alignment pin 40 may be retracted from the second deployed position in response to the vehicle location being outside of the location proximate the vehicle charging system 50.

The controller 26 may be in communication with vehicle sensors configured to provide the location of the vehicle 10 relative to the vehicle charging system 50. These vehicle sensors may include, for example, a forward object sensor, active parking sensor, active cruise sensor, vehicle lane departure sensor, a vehicle navigation system, an optical camera, on board radar, and a Bluetooth receiver or transceiver. In response to the vehicle sensor detecting the location of the vehicle 10 proximate or not proximate the vehicle charging system 50, the controller 26 may command that the alignment pin 40 be deployed or retracted.

Referring to FIGS. 1-3A/B, the vehicle charging system 50 may be provided as a ground station 52. The ground station 52 may be connected to an AC power source to provide electrical power to the ground station 52. The ground station 52 may include a guide 54 having a locating region 56. The guide 54 may be configured to receive the alignment pin 40 and guide the alignment pin 40 along the locating region 56 toward a locating slot 58. The guide 54 may be considered an alignment guide.

The locating region 56 may be tapered at an angle such that the alignment pin 40 may ride along an edge of the locating region 56 towards the locating slot 58. Upon the alignment pin 40 reaching and engaging the locating slot 58, the alignment pin 40 and the guide 54 may be laterally fixed together.

The guide 54 may be pivotally mounted to a rail 70. The guide 54 may pivot about a pivot axis 100 to accommodate any misalignment between the vehicle 10 and the ground station 52. The rail 70 may be an elongate member defining a track 72 configured to receive a portion of the guide 54. The guide 54 may be provided with a sliding structure configured to engage the rail 70 and travel along the track 72.

Figure 3A:
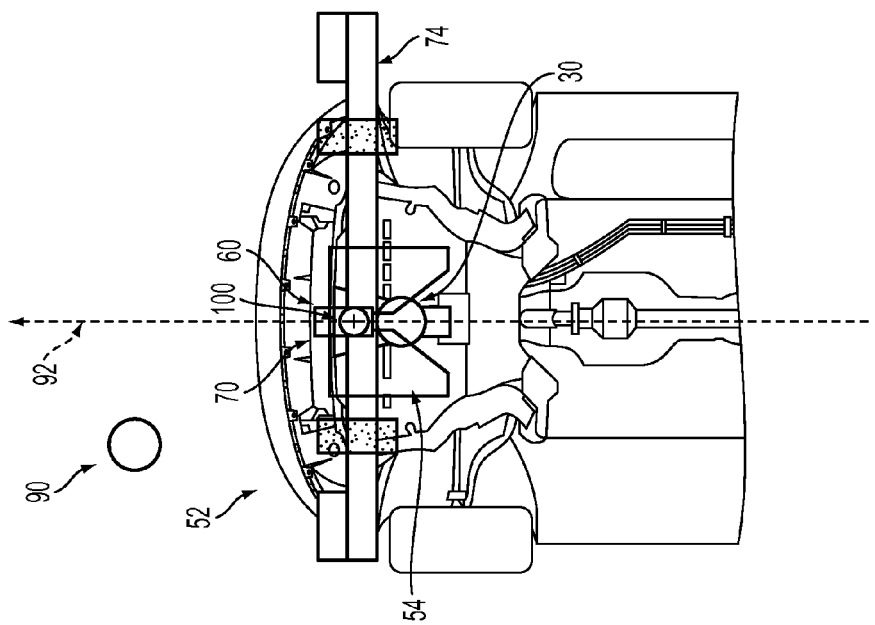
FIGS. 3A and 3B are bottom views of the vehicle and a vehicle charging system.
Figure 3B:
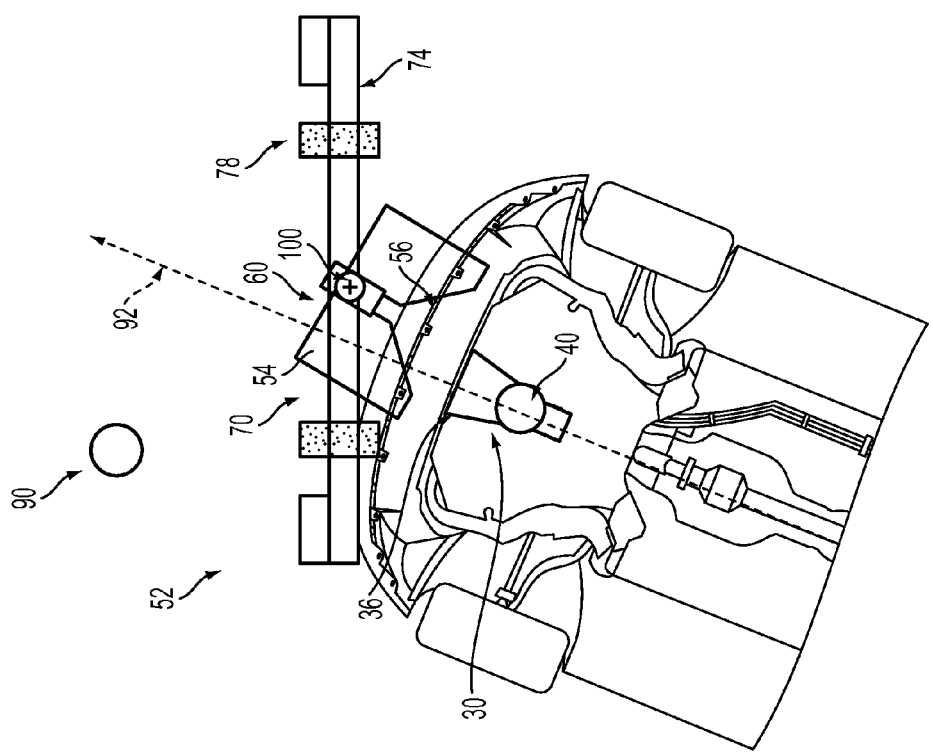

Referring to FIGS. 3A and 3B, the vehicle 10 may approach the ground station 52 at an angle. The forward motion of the vehicle 10 may result in the alignment pin 40 engaging the guide 54. The forward motion of the vehicle may translate the guide 54 along the track 72 and may pivot the guide 54 about a pivot axis 100. The translation and/or pivoting of the guide 54 may center the alignment pin 40 on the guide 54. The centering of the alignment pin 40 on the guide 54 may laterally align the vehicle mounted charge receptacle assembly 30 and the off-vehicle charge delivery device 60 disposed on the guide 54.

The forward motion of the vehicle 10 may advance the alignment pin 40 towards the locating slot 58. As the alignment pin 40 travels deeper into the locating slot 58 the off-vehicle charge delivery device 60 may be aligned longitudinally with the vehicle mounted charge receptacle assembly 30, as shown in FIG. 2B.

The off-vehicle charge delivery device 60 may be spring loaded to accommodate for offset or over-run between the vehicle 10 and the vehicle mounted charge receptacle assembly 30.

The off-vehicle charge delivery device 60 may be adjusted vertically and horizontally by the user as part of the initial installation of the ground station 52. The vertical and horizontal adjustment of the off-vehicle charge delivery device 60 may approximately align the vehicle mounted charge receptacle assembly 30 with the off-vehicle charge delivery device 60.

This adjustment procedure may be performed manually by the driver of the vehicle 10 or to a factory preset according to the specific vehicle application. The receptacle housing 34 may be provided with a tapered region that may accommodate for general misalignment between vehicle mounted charge receptacle assembly 30 and the off-vehicle charge delivery device 60, within a predetermined tolerance.

The rail 70 may be provided with at least one wheel stop 74 disposed proximate the track 72. The wheel stop 74 may be configured to stop a vehicle's forward motion as the off-vehicle charge delivery device 60 is aligned with the vehicle mounted charge receptacle assembly 30. As the vehicle wheels 12 proximately engage the wheel stop 74, the vehicle mounted charge receptacle assembly 30 and the off-vehicle charge delivery device 60 may releasably engage.

The wheel stop 74 may be a conventional wheel chock or similar barrier type structure, for example: a car stop, turtarrier, or parking chock. The wheel stop 74 may ensure longitudinal alignment of the vehicle 10 relative to the ground station 52 to enable the releasable engagement.

The rail 70 may also be provided with a guide stop 78. The guide stop 78 may be configured to restrict the lateral motion of the guide 54 within the track 72 to be within predetermined bounds.

In some embodiments, the ground station 52 may not be anchored or mounted to a floor to reduce installation costs and increase portability of the ground station 52. In these embodiments, the vehicle charging system may be provided with a wheel plate 76. The wheel plate 76 may receive a vehicle wheel 12 of the vehicle, such that the weight of the vehicle 10 may inhibit movement of the ground station 52 by the forward motion of the vehicle 10. Additionally, the ground station 52 may be configured to absorb a portion of the kinetic energy of the vehicle 10.

The off-vehicle charge delivery device 60 may be an electrical connector disposed within a weather-shielding housing 62. The electrical connector may be a J1772 male connector or any other available electrical connector configured to mate with the vehicle mounted charge receptacle assembly 30. The weather-shielding housing 62 may protect the off-vehicle charge delivery device 60 from the elements.

As the vehicle 10 approaches the ground station 52 the receptacle housing 34 approaches the weather-shielding housing 62. The movable door 36 of the receptacle housing 34 may be pushed open by the weather-shielding housing 62 to expose the vehicle mounted charge receptacle assembly 30. The continued forward motion of the vehicle may permit the off-vehicle charge delivery device 60 to engage the vehicle mounted charge receptacle assembly 30.

The vehicle charging system 50 may provide the driver of the vehicle 10 with a visual indicator 90. The visual indicator 90 may extend from the ground station 52 and may be offset from a vehicle centerline 92. The visual indicator 90 may be placed directly in front of the driver's seat to minimize parallax error that may arise if the visual indicator is placed directly in front of the vehicle along the vehicle centerline 92. The visual indicator 90 may provide a visual target to the driver of the vehicle to aid the driver in aligning the vehicle with the vehicle charging system 50.

Figure 4A:
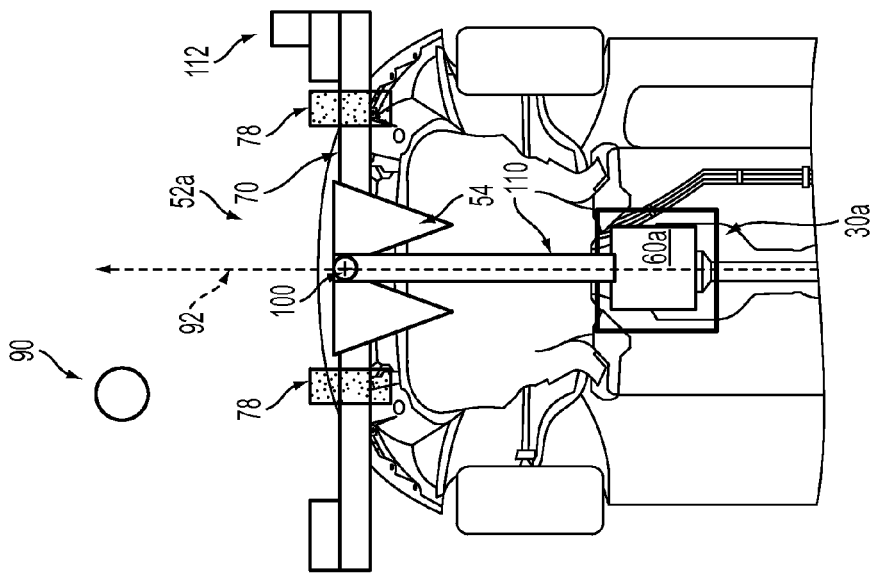
FIGS. 4A and 4B are bottom views of the vehicle and the vehicle charging system.
Figure 4B:
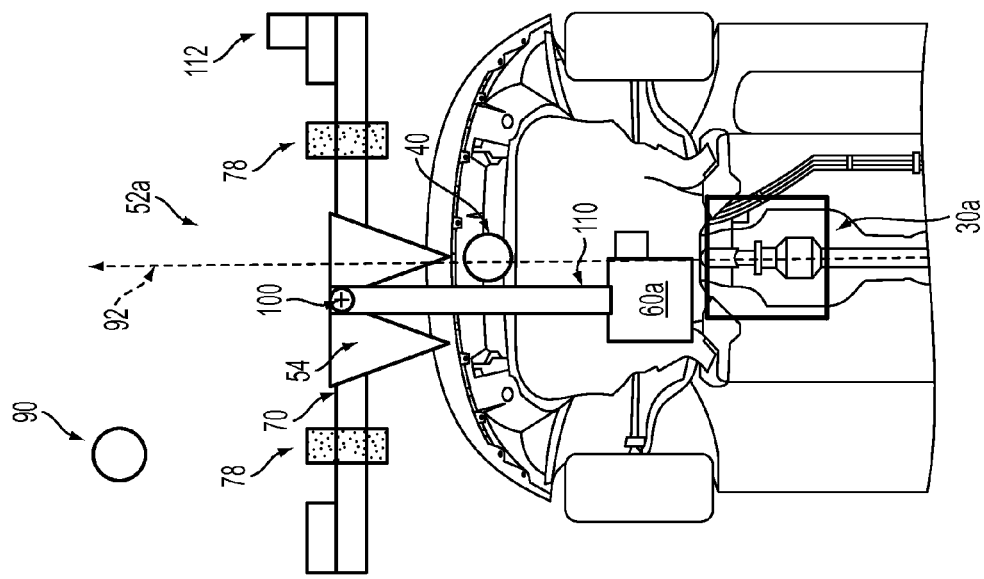

Referring to FIGS. 4A and 4B, the vehicle charging system 50 may be configured as a wireless vehicle charging system. The ground station 52 may be considered a docking station 52a. The guide 54 may be movably and pivotally disposed within the rail 70. As stated above, in response to the alignment pin 40 contacting the guide 54, the guide 54 may be a movable guide configured to pivot and/or translate with respect to the rail 70 to laterally locate the off-vehicle charge delivery device 60a with the vehicle mounted charge receptacle assembly 30a.

The off-vehicle charge delivery device 60a may be configured as a source coil or primary coil. The primary coil may be configured to transfer power to the vehicle mounted charge receptacle assembly 30a, which may include a vehicle coil or secondary coil. The vehicle mounted charge receptacle assembly 30a may be disposed on the vehicle underside 42.

The off-vehicle charge delivery device 60a may be connected to the guide 54 by a coil-supporting superstructure 110. The combination of the off-vehicle charge delivery device 60a and the coil-supporting superstructure 110 may pivot and/or translate with respect to rail 70 to locate the off-vehicle charge delivery device 60a with the vehicle mounted charge receptacle assembly 30a.

The centering of the docking station 52a with the vehicle 10 may align the off-vehicle charge delivery device 60a, with the vehicle mounted charge receptacle assembly 30a. The off-vehicle charge delivery device 60a and the vehicle mounted charge receptacle assembly 30a may be proximately aligned as the vehicle approaches the docking station 52a. The closer the alignment between the off-vehicle charge delivery device 60a and the vehicle mounted charge receptacle assembly 30a, the better the efficiency of wireless power transfer.

The controller 26 may be in communication with vehicle sensors configured to provide the location of the vehicle 10 relative to the docking station 52a. The docking station 52a may be provided with a Bluetooth transmitter 112 in communication with the vehicle 10 and ultimately the controller 26. The Bluetooth transmitter 112 may transmit its existence to the vehicle 10 and in response to sensing the location of the vehicle 10 proximate the docking station 52a the controller 26 may request start of the charge process.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle charging system comprising:
   a charge receptacle mounted to a vehicle;
   an alignment pin mounted to the vehicle; and
   a ground station comprising
      a guide having a locating region configured to receive the alignment pin and in response to the alignment pin contacting the locating region translate the guide along a track; and
      an electrical connector configured to engage the charge receptacle, the electrical connector disposed within a housing associated with the guide.

2. The vehicle charging system of claim 1 wherein the ground station further comprises a visual indicator extending from the ground station offset from a centerline of the vehicle configured to provide a visual target for a driver of the vehicle.

3. The vehicle charging system of claim 1 wherein the track is provided with a wheel stop configured to stop a vehicle's forward motion such that the vehicle mounted charge receptacle is aligned with the electrical connector.

4. The vehicle charging system of claim 1 wherein the guide is configured to pivot about an axis in response to the alignment pin contacting the locating region.

5. The vehicle charging system of claim 1 wherein the guide translates along the track in response to the alignment pin contacting the locating region such that the vehicle mounted charge receptacle is aligned laterally with the electrical connector.

6. The vehicle charging system of claim 1 wherein the vehicle mounted charge receptacle has a tapered region configured to account for misalignment between the charge receptacle and the electrical connector.

7. The vehicle charging system of claim 1 wherein the vehicle mounted charge receptacle is provided with a movable door configured to open in response to the housing engaging the movable door.

8. A vehicle charging system comprising:
   a guide pin disposed on a vehicle underbody;

a secondary coil disposed on the vehicle underbody; and
a docking station having:
  a movable guide configured to receive the guide pin; and
  a primary coil movable with the movable guide to align the primary coil and the secondary coil, in response to the guide pin contacting the movable guide.

9. The vehicle charging system of claim 8 wherein the docking station further comprises a wheel plate configured to receive a vehicle wheel and inhibit motion of the docking station using weight of the vehicle.

10. The vehicle charging system of claim 8 wherein the movable guide and the primary coil are configured to pivot in response to the guide pin contacting the movable guide.

11. The vehicle charging system of claim 8 wherein the guide pin is deployable in response to a vehicle location proximate the docking station.

12. The vehicle charging system of claim 8 wherein the docking station further comprises an elongate member configured to stop forward motion of a vehicle.

13. A plug-in electric vehicle comprising:
a deployable vehicle mounted pin, configured to engage a movable guide to align an off-vehicle charge delivery device with a vehicle mounted charge receiving device, wherein the deployable vehicle mounted pin moves from a first position to a second position in response to the vehicle approaching the off-vehicle charge delivery device and is configured to engage the movable guide when in the second position.

14. The plug-in electric vehicle of claim 13 wherein the vehicle mounted charge receiving device is a charge receptacle and the off-vehicle charge delivery device is an electrical connector configured to releasably engage the charge receptacle.

15. The plug-in electric vehicle of claim 13 wherein the vehicle mounted charge receiving device is a vehicle coil and the off-vehicle charge delivery device is a source coil configured to transfer electrical power to the vehicle coil when aligned with the vehicle coil.

16. The plug-in electric vehicle of claim 13 wherein the first position is a retracted position and the second position is a deployed position.

17. The plug-in electric vehicle of claim 14 wherein the charge receptacle is disposed within a shielding hood provided with a door configured to expose the charge receptacle as the vehicle approaches the electrical connector.

18. The plug-in electric vehicle of claim 14 wherein the electrical connector is disposed proximate the movable guide pivotally mounted to a sliding structure, wherein the movable guide defines a slot configured to receive the deployable vehicle mounted pin and guide the charge receptacle toward the electrical connector.

19. The plug-in electric vehicle of claim 15 wherein the vehicle coil is disposed on an underside of the vehicle above a scuff plane.

* * * * *